United States Patent
Halsey et al.

(10) Patent No.: US 10,926,870 B2
(45) Date of Patent: Feb. 23, 2021

(54) METHOD AND APPARATUS FOR OPERATING A POWER SYSTEM ARCHITECTURE

(71) Applicant: GE Aviation Systems Limited, Gloucestershire (GB)

(72) Inventors: Colin John Halsey, Tewkesbury (GB); Michael David Bailey, Tewkesbury (GB)

(73) Assignee: GE Aviation Systems Limited, Gloucestershire (GB)

( * ) Notice: Subject to any disclaimer, the term of this patent is extended or adjusted under 35 U.S.C. 154(b) by 455 days.

(21) Appl. No.: 15/824,528

(22) Filed: Nov. 28, 2017

(65) Prior Publication Data

US 2018/0155044 A1 Jun. 7, 2018

(30) Foreign Application Priority Data

Dec. 5, 2016 (GB) .................... 1620635

(51) Int. Cl.
*B64D 31/14* (2006.01)
*B64C 25/22* (2006.01)
(Continued)

(52) U.S. Cl.
CPC ............ *B64C 25/22* (2013.01); *B64C 13/40* (2013.01); *H02J 4/00* (2013.01); *B64D 41/00* (2013.01); *B64D 2221/00* (2013.01); *F15B 20/002* (2013.01); *F15B 20/004* (2013.01); *F15B 2211/20515* (2013.01); *F15B 2211/20569* (2013.01); *F15B 2211/625* (2013.01);
(Continued)

(58) Field of Classification Search
CPC .... B64D 41/00; B64D 2221/00; B64D 31/14; B64C 13/40; B64C 25/22; H02J 3/28; F15B 20/002; F15B 20/004; F15B 2211/20515; F15B 2211/20569; F15B 2211/625; F15B 2211/8752; F15B 2211/8757
USPC ............................................ 244/55
See application file for complete search history.

(56) References Cited

U.S. PATENT DOCUMENTS 6,023,134 A * 2/2000 Carl .................. F02C 7/32
290/30 A
6,296,957 B1 10/2001 Graage
(Continued)

FOREIGN PATENT DOCUMENTS

CN 101272955 A 9/2008
CN 104471818 A 3/2015
(Continued)

OTHER PUBLICATIONS

Combined Search and Examination Report issued in connection with corresponding GB Application No. 1620635.1 dated Jun. 2, 2017.
(Continued)

*Primary Examiner* — Claude J Brown
(74) *Attorney, Agent, or Firm* — McGarry Bair PC (57) ABSTRACT

A method and apparatus for operating a power system architecture including an electrical power storage system, a power distribution bus selectively connected with the electrical power storage device, a hydraulic pump selectively connected with the electrical power storage device and a controller module communicatively connected with the electrical power storage system and the hydraulic pump.

14 Claims, 9 Drawing Sheets

(51) Int. Cl.
 B64C 13/40 (2006.01)
 H02J 4/00 (2006.01)
 B64D 41/00 (2006.01)
 H02J 7/34 (2006.01)
 F15B 20/00 (2006.01)

(52) U.S. Cl.
 CPC .............. F15B 2211/8752 (2013.01); F15B 2211/8757 (2013.01); H02J 7/34 (2013.01)

(56) References Cited

U.S. PATENT DOCUMENTS

| | | | |
|---|---|---|---|
| 7,513,119 | B2 | 4/2009 | Zielinski et al. |
| 7,786,620 | B2 | 8/2010 | Vuk et al. |
| 8,232,670 | B2 | 7/2012 | Breit et al. |
| 8,569,906 | B2 | 10/2013 | Stolte et al. |
| 9,028,990 | B2 | 5/2015 | Gans et al. |
| 10,029,631 | B2 | 7/2018 | Iwashima et al. |
| 10,676,208 | B2 | 6/2020 | Wangemann et al. |
| 2010/0276992 | A1 | 11/2010 | Radun |
| 2011/0273012 | A1 | 11/2011 | Tardy |
| 2013/0099560 | A1 | 4/2013 | Shipley et al. |
| 2014/0032002 | A1 | 1/2014 | Iwashima et al. |
| 2017/0327219 | A1* | 11/2017 | Alber ................. B64D 27/24 |
| 2018/0038395 | A1* | 2/2018 | Kemnitz ............ F15B 11/024 |

FOREIGN PATENT DOCUMENTS

| | | |
|---|---|---|
| CN | 105460227 A | 4/2016 |
| GB | 2 422 875 A | 8/2006 |
| WO | 2016/178054 A1 | 11/2016 |

OTHER PUBLICATIONS

Chinese Patent Office, Office Action re Corresponding Application No. 201711272087.8, dated Aug. 21, 2020, 10 pages, China.

* cited by examiner

METHOD AND APPARATUS FOR OPERATING A POWER SYSTEM ARCHITECTURE

BACKGROUND

Contemporary aircraft engines include electric machines, or generator systems, which utilize a running aircraft engine in a generator mode to provide electrical energy to power systems and components on the aircraft. The power generated by the starter/generator can be supplied to a power bus of the aircraft. The power bus, or a set of power buses, can further provide switching operations to selectively enable or disable the delivery of power to particular electrical loads, depending on, for example, available power distribution supply, criticality of electrical load functionality, or aircraft mode of operation, such as take-off, cruise, or ground operations.

Ram Air Turbine (RAT) systems are used in contemporary aircraft as emergency or supplemental power systems. They typically have a turbine, with a rotating hub and a plurality of blades, operably coupled to an electric generator to provide the driving source for the generator. Initially in flight they are stowed in a compartment of the aircraft fuselage, covered by a compartment door. When needed as a source of emergency or supplemental power, the RAT system is deployed from the fuselage into the surrounding airstream, which drives the blades to rotate the generator to extract energy from the airstream. As power requirements for aircraft systems increase, the power generation capabilities of RAT systems continue to increase.

BRIEF DESCRIPTION

In one aspect, a supplemental aircraft power system architecture includes an electrical power storage system, a connection between the electrical power storage system and a power distribution bus in an aircraft, and a controller module communicatively coupled with the connection and configured to selectively actuate the connection upon receiving a power demand signal indicative of a demand for supplemental electrical power to controllably supply power from the electrical power storage system to the power distribution bus.

In another aspect, a power system architecture includes a rechargeable electrical power storage system, a connection between the electrical power storage system and a power distribution bus, a hydraulic pump/generator selectively connected with the rechargeable electrical power storage device, and configured to operate as a motor to provide hydraulic power to a hydraulic system and as a generator to generate electrical power from hydraulic power stored in a hydraulic system, and a controller module communicatively coupled with the connection and the hydraulic pump/generator, and configured to selectively actuate the connection upon receiving a power demand signal indicative of a demand for supplemental electrical power to controllably operate at least one of the electrical power storage system or the hydraulic pump/generator in response to the power demand signal.

In yet another aspect, a method of operating a power system architecture includes receiving, by a control module, a demand signal indicative of at least one of an emergency demand for electrical power or an emergency demand for hydraulic power, and in response to receiving the demand signal, controlling, by the control module, a supplying of electrical power stored in an electrical power storage system to a respective emergency power bus or a hydraulic pump motor, and wherein supplying electrical power is proportional to the emergency demand.

DETAILED DESCRIPTION

While "a set of" various elements will be described, it will be understood that "a set" can include any number of the respective elements, including only one element. Connection references (e.g., attached, coupled, connected, decoupled, disconnected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. The exemplary drawings are for purposes of illustration only and the dimensions, positions, order and relative sizes reflected in the drawings attached hereto can vary.

Aspects of the disclosure are generally directed to the directed to a method and apparatus for operating a power system. One example environment where such a method and apparatus can be used includes, but is not limited to, a power system architecture for an aircraft. While this description is primarily directed toward a power system architecture for an aircraft, it is also applicable to any environment utilizing a power system architecture including a supplemental or emergency power supply for one or more electrical or hydraulic loads. Thus, a brief description of an exemplary power system architecture, is provided for understanding.

Figure 1:
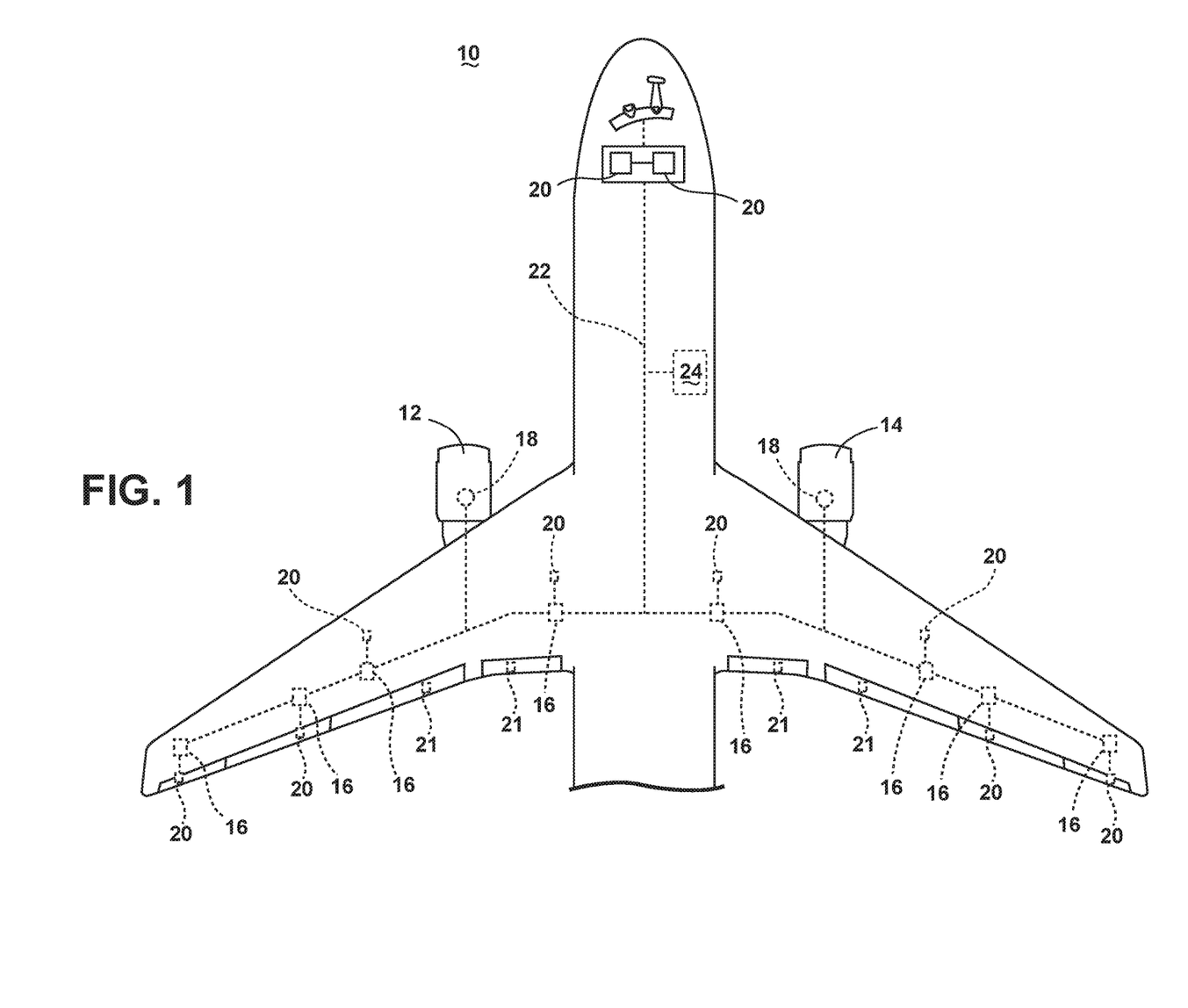
FIG. 1 is a top down schematic view of the aircraft and power system architecture of an aircraft in accordance with various aspects described herein.

As illustrated in FIG. 1, an aircraft 10 is shown having at least one gas turbine engine, shown as a left engine system 12 and a right engine system 14. Alternatively, the power system can have fewer or additional engine systems. The left and right engine systems 12, 14 can be substantially identical, and can further include at least one power source, such as an electric machine or a generator 18. In one non-limiting aspect of the disclosure, the aircraft 10 is shown further having a set of power-consuming components, or electrical loads 20, such as for instance, flight critical loads, and non-flight critical loads. The electrical loads 20 are electrically coupled with at least one of the generators 18 via a power system including, for instance, a set of power transmission lines, such as a power bus 22, or a set of bus bars, and power distribution nodes 16. As used herein "non-critical" electrical loads can include in-flight entertainment, galley functions, or the like, while "flight-critical" electrical loads can include flight management system, electrical flight actuators, or the like.

The aircraft 10 can also include an electrical power storage system 24 selectively connected, by way of an operable connection, with the power bus 22 and configured to operably supply electrical power to the electrical loads 20 or a subset thereof, by way of the power bus 22. While the generators 18 and the electrical power storage system 24 are illustrated connected with a common power bus 22 or power bus, aspects of the disclosure can be included wherein the power bus 22 represent a set of independent or selectively connected power buses 22. For instance, the power buses 22 can representatively include, but is not limited to, a left engine or generator bus, a right engine or generator bus, an emergency power bus, or the like. In another non-limiting aspect of the disclosure, the aircraft 10 is shown having a set of hydraulic loads 21, such as for instance, actuator loads.

In the aircraft 10, the operating left and right engine systems 12, 14 provide mechanical energy which can be extracted, typically via a spool, to provide a driving force for the generator 18. The generator 18, in turn, generates electrical power, such as an alternating current (AC) or direct current (DC) power, and provides the generated power to the power bus 22, which delivers the power to the power distribution nodes 16, positioned throughout the aircraft 10. The power distribution nodes 16 receive the AC or DC power via the power bus 22, and can provide switching, power conversion, or distribution management functions, as needed, in order to provide the desired electrical power to the electrical loads 20 for load operations. In addition to power generation activities, at least one of the aircraft 10, the engine systems 12, 14, or the generators 18 can operably provide hydraulic fluid, hydraulic pressure, hydraulic power, or the like, in order to provide the desired hydraulic power to the set of hydraulic loads 21. In one non-limiting aspect of the disclosure, the engine systems 12, 14 can provide mechanical energy, as previously explained, to provide hydraulic power. In another non-limiting aspect of the disclosure, the aircraft 10 can include a hydraulic motor pump configured to operably supply hydraulic power in response to a supply of electrical energy, such as from the generators 18.

Example power distribution management functions can include, but are not limited to, selectively enabling or disabling the delivery of power to particular electrical loads 20, by way of the operable connection, depending on, for example, available power distribution supply, criticality of electrical load 20 functionality, or aircraft mode of operation, such as take-off, cruise, or ground operations. Additional management functions can be included.

During emergency or inadequate periods of electrical or hydraulic power generator, including but not limited to engine or generator failure, at least one additional power source can be operated, enabled, or connected for providing power to the electrical loads 20 or hydraulic loads 21. The at least one additional power source can include, but is not limited to, the electrical power storage system 24, a ram air turbine systems, a starter/generator, an auxiliary power unit or the like. In this sense, the at least one additional power source can supplement, or can substitute for, a primary power source, such as the generators 18. Aspects of the disclosure can be included wherein the electrical power storage system is the only additional or available power source for emergency power.

It will be understood that while aspects of the disclosure are shown in an aircraft environment of FIG. 1, the disclosure is not so limited and has general application to electrical power systems in non-aircraft applications, such as other mobile applications and non-mobile industrial, commercial, and residential applications. For example, while this description is directed toward a power system architecture in an aircraft, aspects of the disclosure can be further applicable to provide power, supplemental power, emergency power, or the like, in otherwise non-emergency operations, such as takeoff, landing, or cruise flight operations. It will be understood that the illustrated aspects of the disclosure are only one non-limiting example of an aircraft 10, and many other possible aspects and configurations in addition to that shown are contemplated by the present disclosure.

Furthermore, the number of, and placement of, the various components depicted in FIG. 1 are also non-limiting examples of aspects associated with the disclosure. For example, while various components have been illustrated with relative position of the aircraft (e.g. the electrical loads 20 on the wings of the aircraft 10, the hydraulic loads 21 on the wings of the aircraft, the electrical power storage system 24 in the fuselage of the aircraft, etc.), aspects of the disclosure are not so limited, and the components are not so limited based on their schematic depictions. For example, the electrical power storage system 24 can be located in the rear of the aircraft 10 (e.g. the tail section), or can be distributed throughout the aircraft 10 to provide aircraft balance during flight operations. Addition aircraft configurations are envisioned.

In one non-limiting aspect of the disclosure, the power bus 22 can be configured to operate at a common set of electrical characteristics, including, but not limited to, three phases of 115 Volts AC (VAC) power at 400 Hertz, a single phase of 115 VC power at 400 Hertz, 270 Volts DC (VDC) power, plus or minus 270 VDC power, 28 VDC power, or a combination thereof. In this sense, the generators 18, the electrical power storage system 24, or any other power supplying systems can be selected, operated, or configured to generate, supply, or provide the common characteristic power to the respective power bus 22. Aspects are included wherein multiple unconnected power buses 22 operate at dissimilar electrical characteristics.

Figure 2:
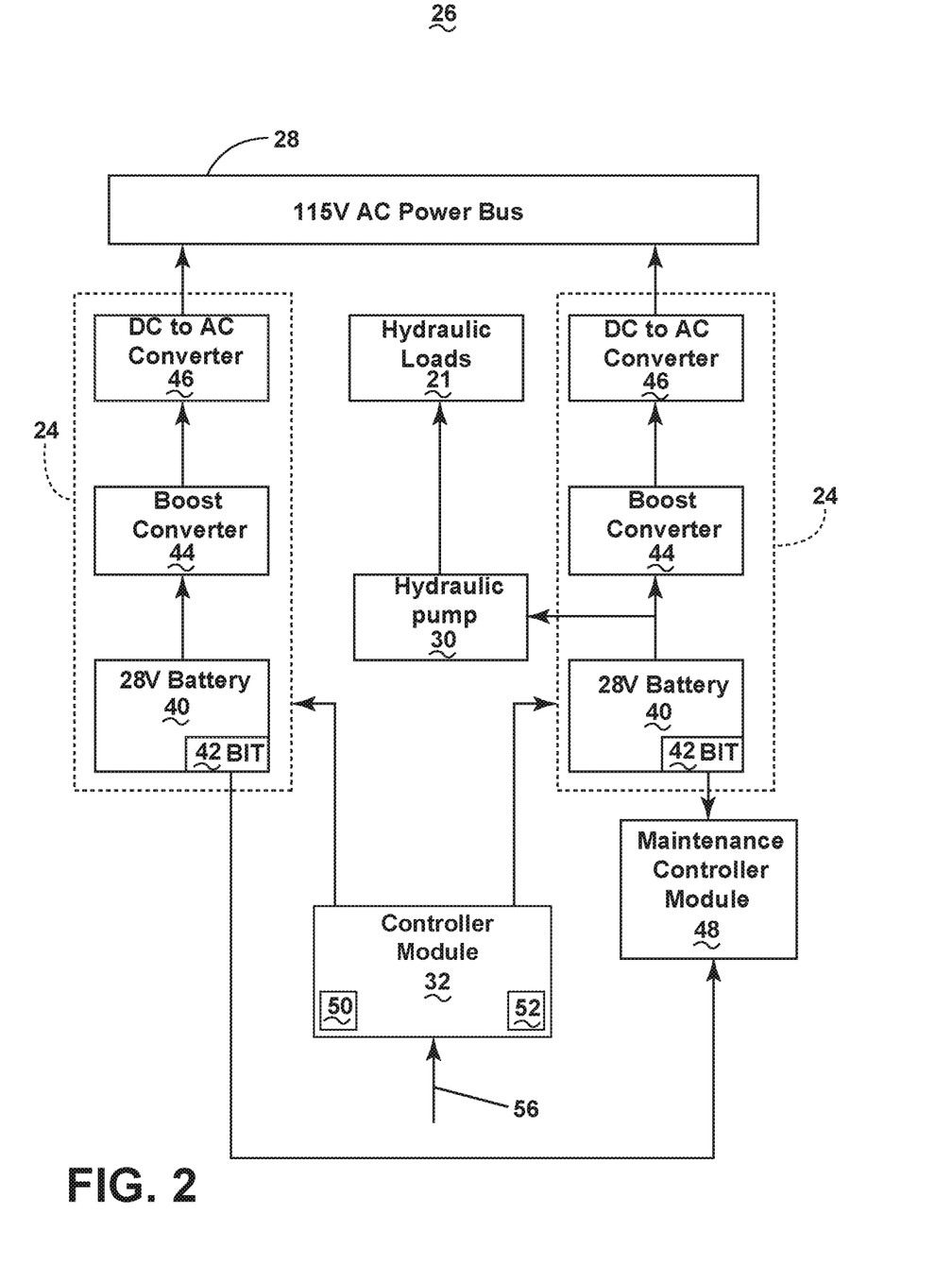
FIG. 2 is a schematic view of an electrical power system, in accordance with various aspects described herein.

FIG. 2 illustrates one non-limiting example of a power system architecture 26, in accordance with various aspects described herein. The power system architecture 26 can include, but is not limited to, an AC power bus 28, illustrated as an 115 VAC power bus, a set of electrical power storage systems 24, a hydraulic pump 30 connected with the set of hydraulic loads 21 (schematically illustrated as a single hydraulic load 21), a controller module 32, and an optional maintenance controller module 48. The AC power bus 28 can include, for example, an emergency power bus, a supplemental power bus, an essential power bus, a flight critical power bus, a primary power bus, or the like. The set of electrical power storage systems 24 are shown selectively connected with the AC power bus 28 and communicatively connected with the controller module 32 and the optional maintenance controller module 48. The hydraulic pump 30 is shown electrically connected with at least one of the electrical power storage systems 24. In this sense, the hydraulic pump 30 can include an electric motor configured to supply or provide hydraulic fluid, hydraulic pressure, or hydraulic power to the set of hydraulic loads 21, in response to a supply of electrical power.

While the hydraulic pump 30 is illustrated electrically connected with at least one of the electrical power storage systems 24, non-limited aspects of the disclosure can be included wherein the hydraulic pump 30 is electrically connected with the AC power bus 28, but still receives power supplied by at least one of the electrical power storage systems 24 by way of the AC power bus 28. In this example, the hydraulic pump 30 can include power converting circuitry to convert electricity received into a form utilized for pump operation. For example the hydraulic pump 30 can include an AC to DC converter, a DC to AC converter, a DC to DC converter, an AC to AC converter, a boost converter, or the like. In another non-limiting aspect of the disclosure, the hydraulic pump 30 can include a redundant or emergency hydraulic pump 30, selectively operable to replace or supplement a primary hydraulic pump 30 or hydraulic system.

The set of electrical power storage systems 24 can include, for example, in a serial connection, an electrical storage device, such as a 28 VDC battery 40, a boost converter 44, and a power converter, such as a DC to AC converter 46. The 28 VDC battery 40 can include a set of batteries, a bank of batteries, a set of battery cells, or the like. The 28 VDC battery 40 can further include a built in test (BIT) module 42 configured to operably determine a monitored voltage, storage capacity, charge, or the like, collectively referred to as the "health" of the battery. Non-limiting aspects of the 28 VDC battery 40 can include single-use (e.g. non-rechargeable) batteries 40 or rechargeable batteries 40. Additionally, while a 28 VDC battery 40 is described and illustrated, any electrical storage device can be utilized in aspects of the disclosure, including, but not limited to, batteries having alternative voltage characteristics, such as 270 VDC. For instance, non-limiting aspects of the electrical storage device can include capacitors, supercapacitors, fuel cells, photovoltaic cells, thermal generators, of the like, or set or banks thereof.

The 28 VDC battery 40 can be further controllably operated to provide energy stored in the electrical storage device to the boost converter 44, which can be configured to operably alter, modify, convert, or change the energy supplied by the battery 40 a second, different energy. For instance, in one non-limiting example of the disclosure can be included wherein the boost converter 44 can be configured to "step up" the DC voltage, that is, wherein the output voltage is higher than the input voltage from the 28 VDC battery 40. In another non-limiting example of the disclosure, the boost converter 44 can be operably exchanged or replaced with another converter, such as a Buck converter, configured to "step down" the DC voltage, that is, wherein the output voltage is lower than the input voltage from the 28 VDC battery 40. In this sense, the converter can include a boost converter 44 or another type of converter configured for raising or lowering the output of the converter relative to the input of the converter.

The boost converter 44 can further provide the "boosted" output voltage to the DC to AC converter 46, which can include a solid state power converter or switch, configured to alter, modify, convert, or change the boosted DC output voltage to the AC power characteristics of the AC power bus 28.

The electric storage device, such as the set of 28 VDC batteries 40, or a subset of batteries 40 from one or more of the set of electrical power storage systems 24 can be communicatively connected with the optional maintenance controller module 48 such that the BIT module 42 can provide the health of the respective batteries 40 to the maintenance controller module 48. The maintenance controller module 48 can, for instance, log the respective battery 40 health statuses, predict or report battery health issues such as failures, approaching end of life cycle, battery charge depletion, aspects related to the charge or rechargeability of the battery 40, the energy production rate, the battery fuel, or the like. In non-limiting aspect of the disclosure, the optional maintenance controller 48 can generate maintenance records or requests based on the respective battery 40 health, such as indicating replacement is requested or further diagnosis is requested. In another non-limiting aspect of the disclosure, the aforementioned communication between the set or subset of the 28 VDC batteries 40, the BIT module 42, and the optional maintenance controller module 48 can be provided or communicated to the controller module 32 for similar or replacement functionality.

The controller module 32 of the power system architecture 26 can include a processor 50 and memory 52, and can be configured to controllably operate or enable the operation of the power system architecture 26. In one non-limiting aspect of the disclosure, the controller module 32 can be configured to controllably operate the power system architecture 26 based on receiving a demand signal, schematically illustrated as input 56. Aspects of the demand signal 56 can include, indicate, or be representative of a power demand signal (i.e. a demand for emergency or supplemental electrical power), a hydraulic demand signal (i.e. a demand for emergency or supplemental hydraulic pressure, fluid, or power), or a combination thereof. In yet another aspect, the demand signal 56 can be include, indicate, or be representative of an operational state of the power system architecture, aircraft, or overall performance, such as a signal indicating normal operations or emergency operations. Additionally, while a single demand 56 signal is illustrated, a set of demand signals 56 can be provided to the controller module 32 including, indicating, or be representing independent demand signals 56, such as the power demand signal or a hydraulic demand signal. In non-limiting aspects of the disclosure, the demand signal 56 can originate from a power bus, a health monitoring system, an emergency or supplemental power demand controller, another avionics computer or controller, or the controller module 32, itself. In another non-limiting aspect of the disclosure, the demand signal 56 can be related to or indicative of an amount of demanded resource, such as power, hydraulic power, or the like.

In such an example, the controller module 32, in response to receiving the demand signal 56, can control the initiation of supplying electrical power by way of the electrical power storage system 24, the electrical storage device such as the 28 VDC battery 40, or supplying hydraulic power by way of the hydraulic pump 30. In this sense, at least one of the controller module 32 or the processor 50 can be operably coupled with the memory 52, wherein the memory 52 can store a set of operational control profiles or programs for operating the supplying of electrical or hydraulic power by way of the electrical power storage system 24, as described herein.

The memory 52 can include random access memory (RAM), read-only memory (ROM), flash memory, or one or more different types of portable electronic memory, such as discs, DVDs, CD-ROMs, etc., or any suitable combination of these types of memory. The controller module 32 or the processor 50 can be operably coupled with the memory 52 such that one of the controller module 32 or the memory 52 can include all or a portion of a computer program having an executable instruct ion set for controlling the operation of the aforementioned components, or a method of operating the same. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

Machine-executable instructions, associated data structures, and programs represent examples of program code for executing the exchange of information as disclosed herein. Machine-executable instructions can include, for example, instructions and data, which cause a general purpose computer, special purpose computer, controller module 32, processor 50, or special purpose processing machine to perform a certain function or group of functions. In implementation, the functions can be converted to a computer program comprising a set of executable instructions, which can be executed by the processor 50. Aspects of the disclosure can be included wherein the controller module 32 or the processor 50 can be configured to operably control or enable the supplying of electrical power or hydraulic power by way of the electrical power storage system 24 by controllably operating at least a subset of the 28 VDC battery 40, the boost converter 44, or the DC to AC converter 46.

Aspects of the disclosure provide a robust power system architecture 26 for supplying emergency or supplemental electrical power to a set or subset of electrical load (including, by not limited to emergency, flight critical, or essential loads) or for supplying emergency or supplemental hydraulic power to a set or subset of hydraulic loads 21 (including, but not limited to actuator loads). Additional non-limiting aspects of the disclosure can be configured, arranged, or the like, to provide sufficient or minimal electrical power to enable primary operation of, for example, the aircraft. For instance, non-limiting aspects of the disclosure can be configured to provide sufficient or minimal electrical power to enable the aircraft to remain airborne during flight operations (e.g. powering emergency or flight critical loads, or hydraulic operations) for a predetermined period of time while entirely supported by the electrical power storage system 24.

One non-limiting aspect of the disclosure can be included wherein the predetermined period of time is standardized, or defined by a relevant certification or certifying body. One such predetermined period of time is standardized, or defined by a relevant certification or certifying body can include extended operations (ETOPS) certification, defined and issued by the international civil aviation organization (ICAO). In one non-limiting example, an aircraft can be certified for 180 minutes, which means the aircraft is permitted to fly a flight route not more than 180 minutes of single-engine flying time to the nearest suitable airport. In the aforementioned example, the electrical power storage system 24, or a set there of, can be configured for a particular aircraft such that the total electrical power capacity of the system 24 can meet the ETOPS requirements or certification when all electrical power is lost from, for example, the main engine generators, an auxiliary power unit, other power sources, or a combination thereof. Additional certifications or standards can be utilized to define total electrical power capacity of the electrical power storage system 24.

Aspects of the disclosure can be included wherein the electrical storage device, such as the 28 VDC battery 40, or the electrical power storage system 24 can be configured in removable unit, such as a plug-in or replaceable cartridge. The replaceable cartridge can further be disposed or located such that ground or maintenance personnel can operably access and replace the units or cartridges from outside the aircraft, such as during ground operations. In this sense, aspects of the disclosure can be included wherein at least one of the controller module 32, the maintenance controller module 48, or the BIT module 42 can be utilized to identify electrical power storage systems 24, electrical storage devices, batteries 40, or the like, that need to be charged, exchanged, replaced, or the like, to ensure ETOPS requirements prior to a flight operation taking place.

Figure 3:
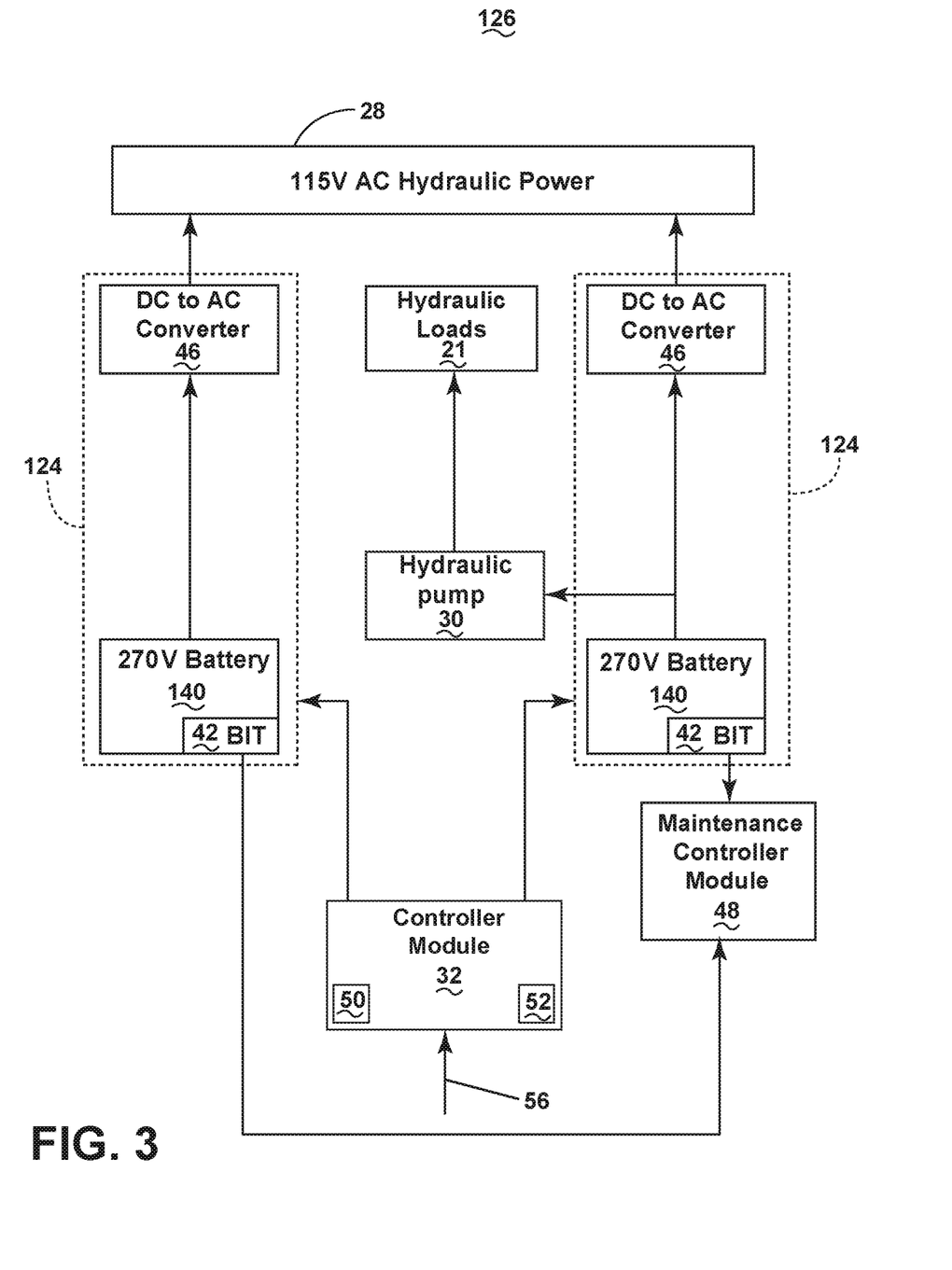
FIG. 3 is a schematic view of another electrical power system, in accordance with various aspects described herein.

FIG. 3 is another non-limiting example of the power system architecture 126 in accordance with various aspects described herein. The power system architecture 126 is similar to the power system architecture 26; therefore, like parts will be identified with like numerals increased by 100, with it being understood that the description of the like parts of the electrical power system architecture 26 applies to the electrical power system architecture 126, unless otherwise noted. One difference is that the electrical power storage system 124 can include a higher-voltage energy storage device, illustrated as 270 VDC batteries 140. In the illustrated example, the higher-voltage 270 VDC batteries 140 can directly supply power to the DC to AC power converter 46 or the hydraulic pump 30 without first converting the power by way of a boost converter.

Figure 4:
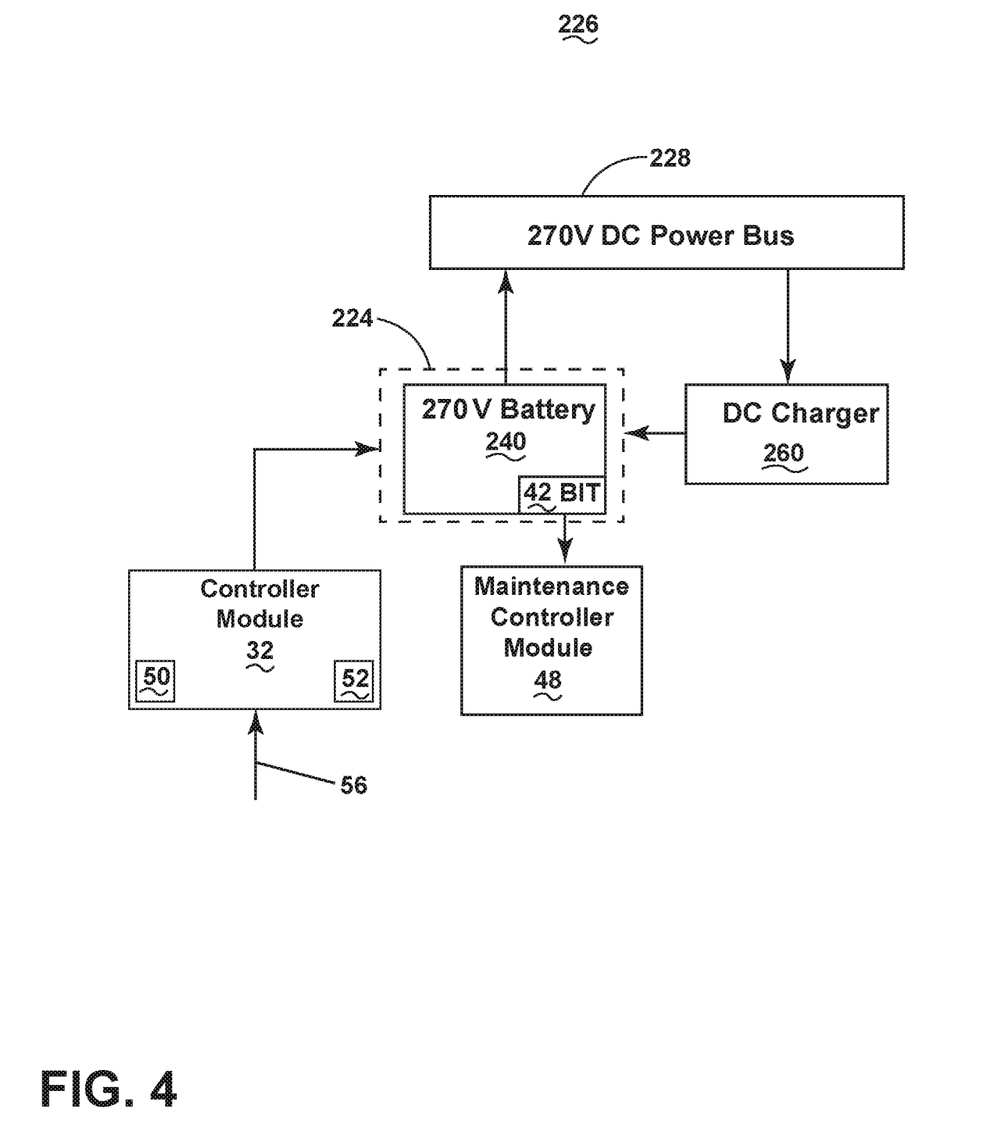
FIG. 4 is a schematic view of an electrical power system having a rechargeable power storage system, in accordance with various aspects described herein.

FIG. 4 is another non-limiting example of the power system architecture 226 in accordance with various aspects described herein. The power system architecture 226 is similar to the power system architectures 26, 126; therefore, like parts will be identified with like numerals increased by 200, with it being understood that the description of the like parts of the electrical power system architecture 26, 126 applies to the electrical power system architecture 226, unless otherwise noted. One difference is that the electrical power storage system 224 can include a higher-voltage rechargeable energy storage device, illustrated as rechargeable 270 VDC batteries 240. Another difference is that the power bus can include a 270 VDC power bus 228 that is directly supplied with 270 VDC power from the electrical power storage system 224, the electrical storage device, or the rechargeable 270 VDC batteries 240, without a converter. The power system architecture 226 can further include a DC charger 260 electrically connected with the DC power bus 228 and the electrical power storage system 224 or the rechargeable 270 VDC battery 240. The DC charger 260 can be configured to operably control the recharging or storage of electrical power in the electrical storage unit or rechargeable 270 VDC battery 240. In this sense, the rechargeable 270 VDC battery 240 is not operably supplying electrical power to the DC power bus 228, when the DC power bus 228 has excess or supplemental power not otherwise being utilized, or a combination thereof, the DC charger 260 can operably use the electrical power, or excess electrical power from the DC power bus 228 to resupply or recharge the battery 240, or the like. Aspects of the rechargeable 270 VDC battery 240 or the DC charger 260 can be included wherein one of the modules operably controls the recharging rate, recharging status, stored electrical capacity, or the like, of the battery 240.

Figure 5:
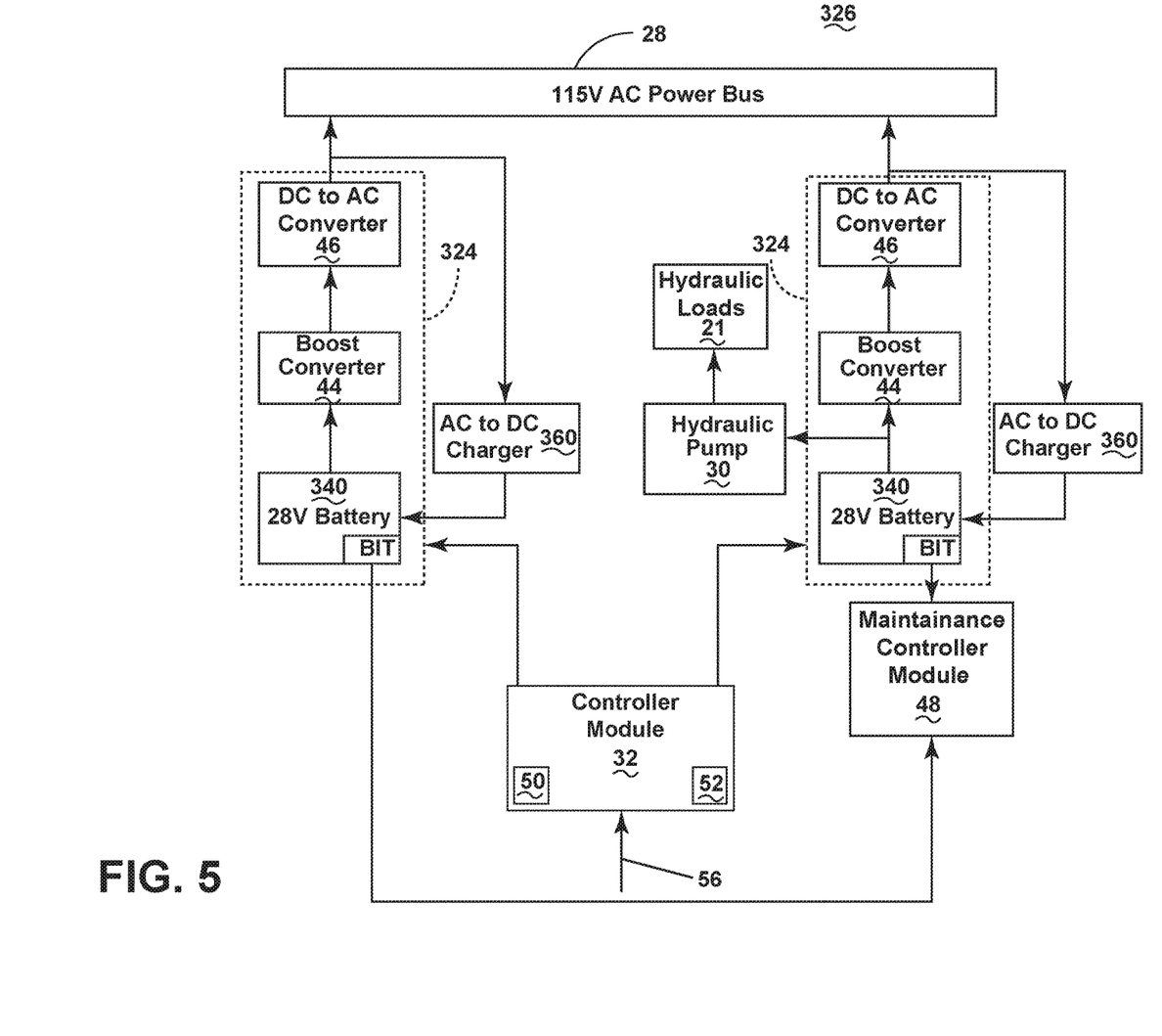
FIG. 5 is a schematic view of another electrical power system having a rechargeable power storage system, in accordance with various aspects described herein.

FIG. 5 is another non-limiting example of the power system architecture 326 in accordance with various aspects described herein. The power system architecture 326 is similar to the power system architectures 26, 126, 226; therefore, like parts will be identified with like numerals increased by 300, with it being understood that the description of the like parts of the electrical power system architecture 26, 126, 226 applies to the electrical power system architecture 326, unless otherwise noted. One difference is that the electrical power storage system 324 can include a rechargeable energy storage device, illustrated as rechargeable 28 VDC batteries 340. The power system architecture 326 can further include an AC to DC charger 360 electrically connected with the AC power bus 28 and the electrical power storage system 324 or the rechargeable 28 VDC battery 340. The AC to DC charger 360 can be configured to operably control the recharging or storage of electrical power in the electrical storage unit or rechargeable 28 VDC battery 340. In this sense, when the rechargeable 28 VDC battery 340 is not operably supplying electrical power to the AC power bus 28 (via, for instance, the boost converter 44 or the DC to AC converter 46), when the AC power bus 28 has excess or supplemental power not otherwise being utilized, or a combination thereof, the AC to DC charger 360 can operably use the electrical power, or excess electrical power from the AC power bus 28 to resupply or recharge the battery 340, or the like. Aspects of the rechargeable 28 VDC battery 340 or the AC to DC charger 360 can be included wherein one of the modules operably controls the recharging rate, recharging status, stored electrical capacity, or the like, of the battery 340. Additionally, aspects of the AC to DC charger 360 can be included wherein charger 360 can operably convert AC power received from the AC power bus 28 to an appropriate DC power suitable for charging or recharging the 28 VDC battery 340.

Figure 6:
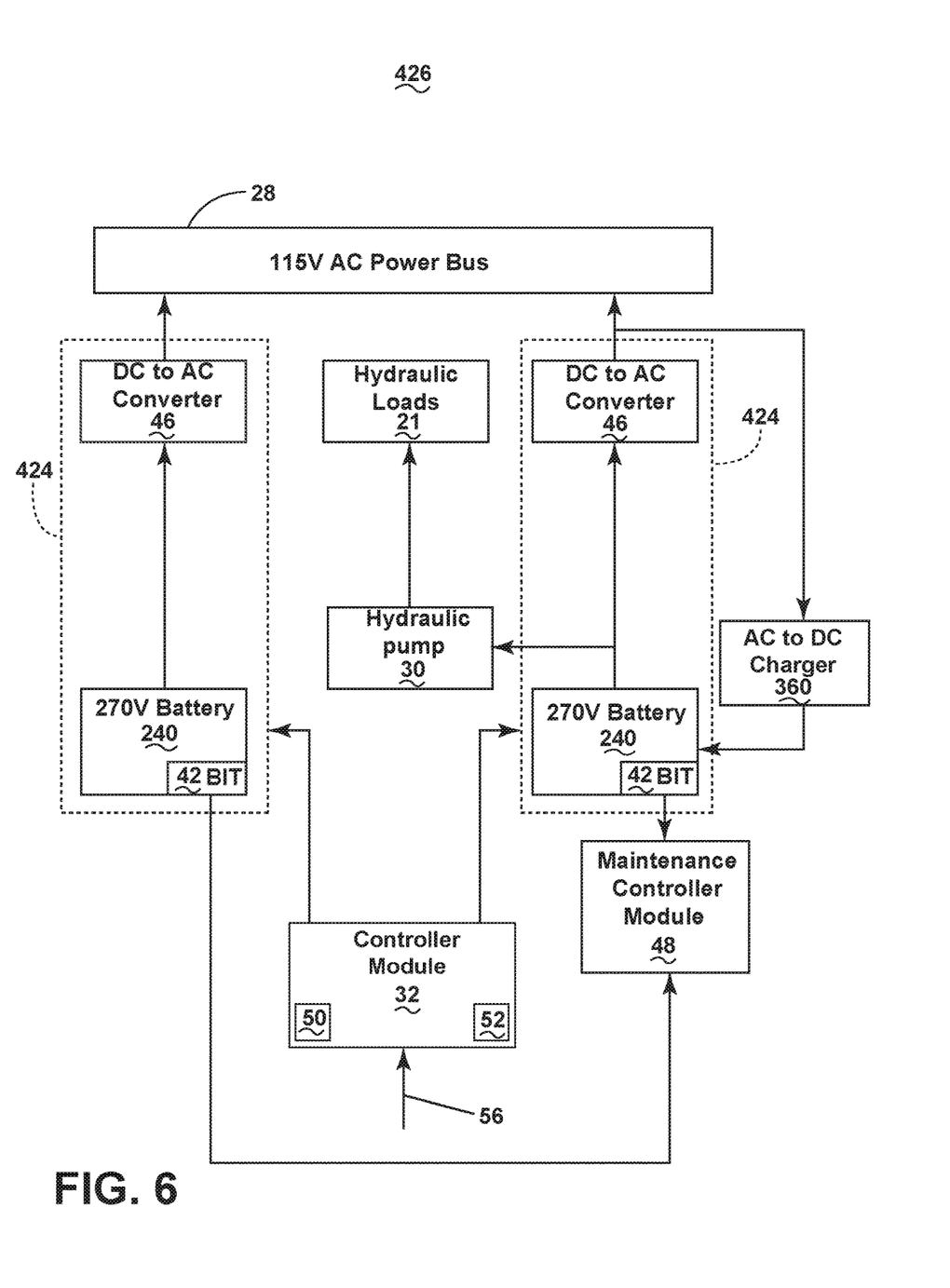
FIG. 6 is a schematic view of yet another electrical power system having a rechargeable power storage system, in accordance with various aspects described herein.

FIG. 6 is another non-limiting example of the power system architecture 426 in accordance with various aspects described herein. The power system architecture 426 is similar to the power system architecture 26, 126, 226, 326; therefore, like parts will be identified with like numerals increased by 400, with it being understood that the description of the like parts of the electrical power system architecture 26, 126, 226, 326 applies to the electrical power system architecture 426, unless otherwise noted. One difference is that the electrical power storage system 424 can include a higher-voltage rechargeable energy storage device, illustrated as rechargeable 270 VDC batteries 240. In the illustrated example, the higher-voltage 270 VDC batteries 240 can directly supply power to the DC to AC power converter 46 or the hydraulic pump 30 without first converting the power by way of a boost converter.

The power system architecture 426 can further include an AC to DC charger 360 electrically connected with the AC power bus 28 and the electrical power storage system 424 or the rechargeable 270 VDC battery 240. The AC to DC charger 360 can be configured to operably control the recharging or storage of electrical power in the electrical storage unit or rechargeable 270 VDC battery 240. In this sense, when the rechargeable 270 VDC battery 240 is not operably supplying electrical power to the AC power bus 28, when the AC power bus 28 has excess or supplemental power not otherwise being utilized, or a combination thereof, the AC to DC charger 360 can operably use the electrical power, or excess electrical power from the AC power bus 28 to resupply or recharge the battery 240, or the like. Aspects of the rechargeable 270 VDC battery 240 or the AC to DC charger 360 can be included wherein one of the modules operably controls the recharging rate, recharging status, stored electrical capacity, or the like, of the battery 240. Additionally, aspects of the AC to DC charger 360 can be included wherein charger 360 can operably convert AC power received from the AC power bus 28 to an appropriate DC power suitable for charging or recharging the 270 VDC battery 240.

Figure 7:
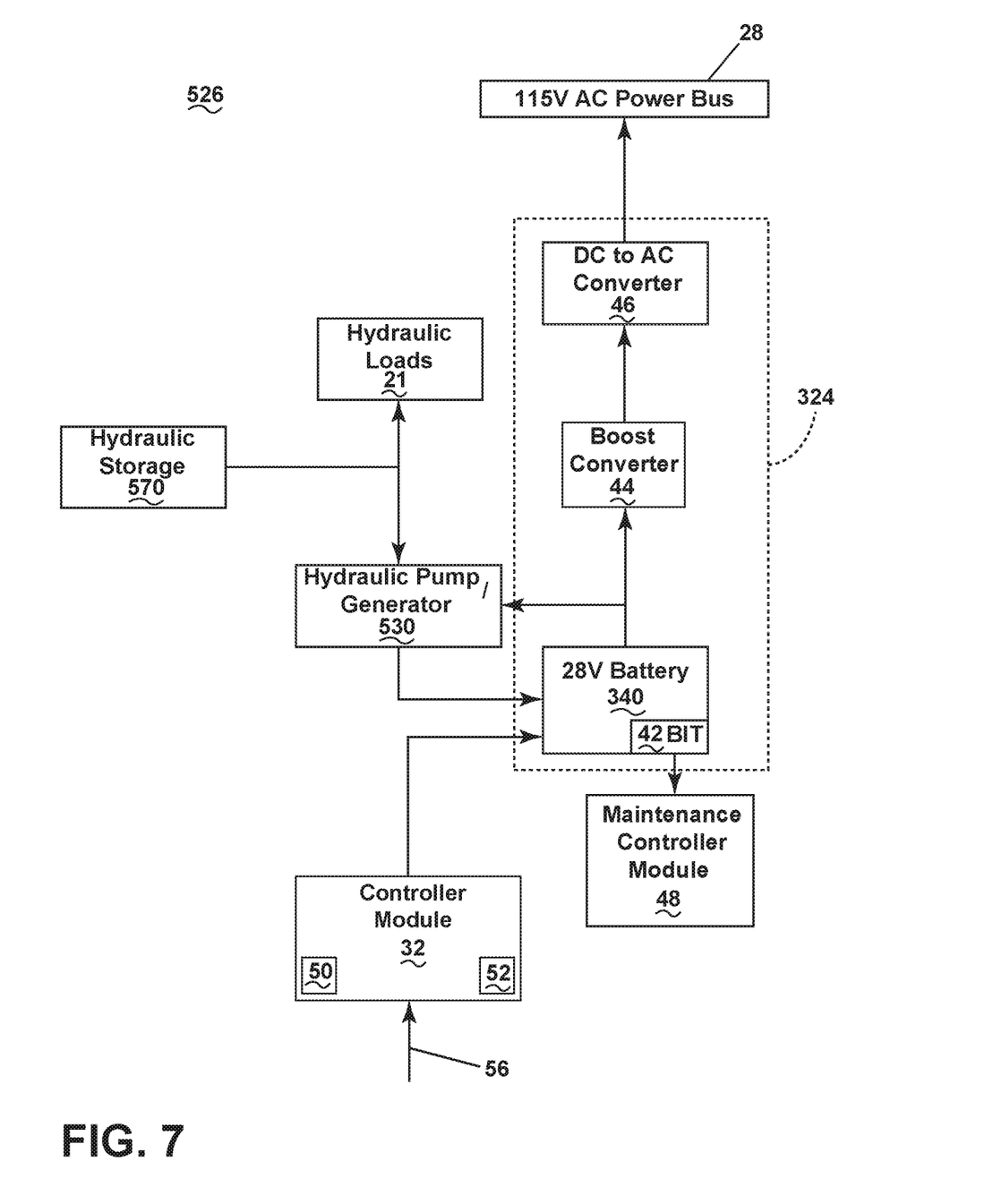
FIG. 7 is a schematic view of an electrical power system having a hydraulic pump/generator, in accordance with various aspects described herein.

FIG. 7 is another non-limiting example of the power system architecture 526 in accordance with various aspects described herein. The power system architecture 526 is similar to the power system architecture 26, 126, 226, 326, 426; therefore, like parts will be identified with like numerals increased by 500, with it being understood that the description of the like parts of the electrical power system architecture 26, 126, 226, 326, 426 applies to the electrical power system architecture 526, unless otherwise noted. One difference is that the electrical power system architecture 526 can include a hydraulic pump/generator 530 connected with the hydraulic loads 21 and a hydraulic power storage device 570. The hydraulic power storage device 570 can include a device configured to storage of hydraulic fluid, pressurized hydraulic fluid, or the like. Non-limiting examples of the hydraulic power storage device 570 can include a storage chamber or storage vessel.

The hydraulic pump/generator 530 can be configured, in one non-limiting example, to operate as a motor to provide hydraulic power, hydraulic liquid, hydraulic pressure, or the like, to at least one of the hydraulic loads 21 or the hydraulic power storage device 570 (collectively referred to as "the hydraulic system"). In addition to operating as a motor, the non-limiting examples of the hydraulic pump/generator 530 can also operate as an electrical power generator, wherein hydraulic power, fluid, or pressure is delivered or provided to the hydraulic pump/generator 530, and wherein the pump/generator 530 generates electrical power in response to the hydraulic power, fluid, or pressure exposure. In this sense, the hydraulic pump/generator 530 can be operably configured to charge or recharge the electrical storage unit or rechargeable battery, illustrated as a rechargeable 28 VDC battery 340. In this sense, when the hydraulic pump/generator 530 is not operably supplying electrical power to the hydraulic loads 21, hydraulic power storage device 570, hydraulic system, or the like, when the hydraulic system has excess or supplemental hydraulic power not otherwise being utilized, or a combination thereof, the hydraulic pump/generator 530 can operably use the hydraulic fluid, pressure, or excess power from the hydraulic system to operate the hydraulic pump/generator 530 as a generator to resupply or recharge the battery 340, or the like. Aspects of the rechargeable 28 VDC battery 340 or hydraulic pump/generator 530 can be included wherein one of the modules operably controls the recharging rate, recharging status, stored electrical capacity, or the like, of the battery 340. Additionally, aspects of the 28 VDC battery 340 or hydraulic pump/generator 530 can be included wherein battery 340 or pump/generator 530 can operably convert AC power generated by the pump/generator 530 to an appropriate DC power suitable for charging or recharging the 28 VDC battery 340.

Figure 8:
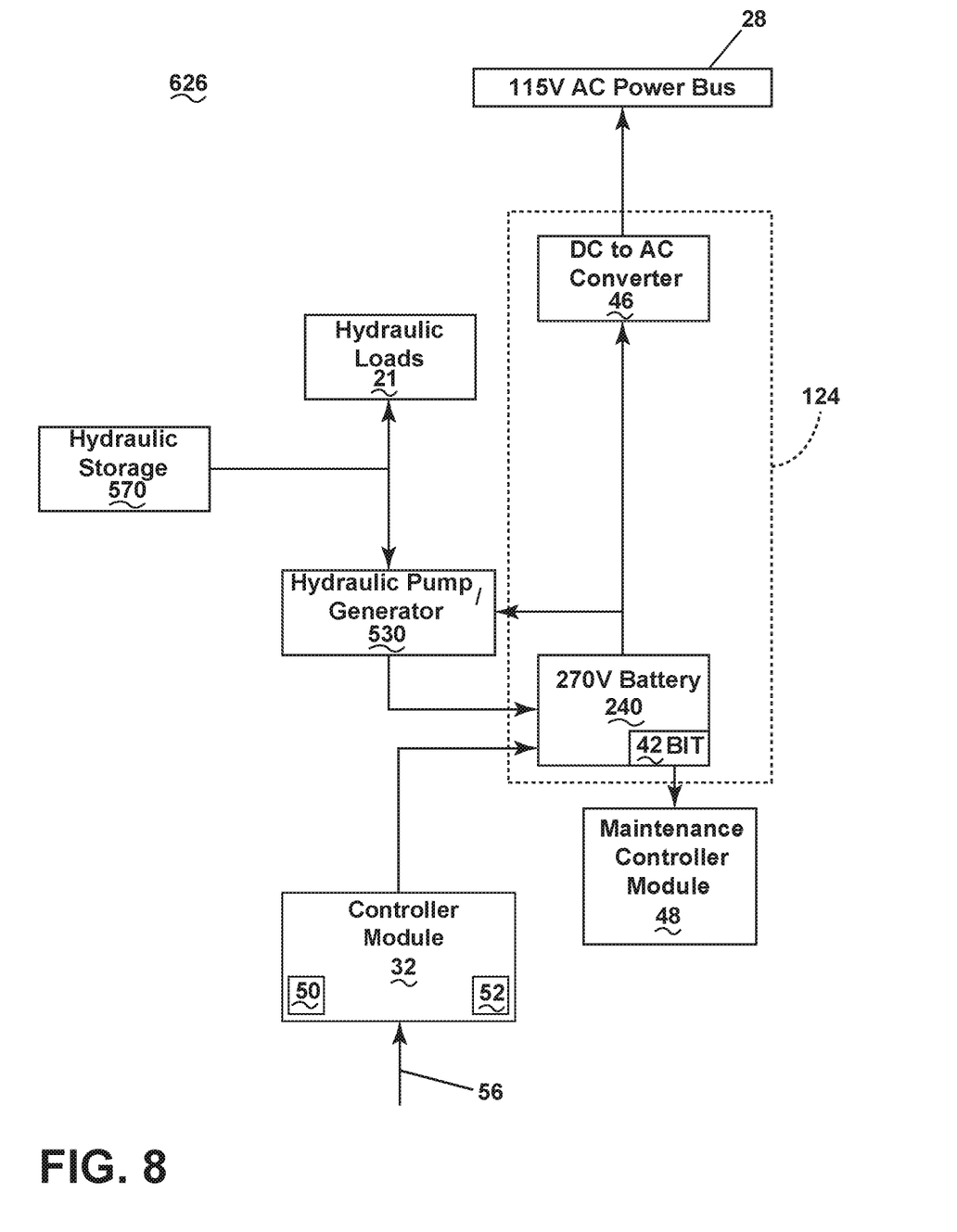
FIG. 8 is a schematic view of another electrical power system having a hydraulic pump/generator, in accordance with various aspects described herein.

FIG. 8 is another non-limiting example of the power system architecture 626 in accordance with various aspects described herein. The power system architecture 626 is similar to the power system architecture 26, 126, 226, 326, 426, 526; therefore, like parts will be identified with like numerals increased by 600, with it being understood that the description of the like parts of the electrical power system architecture 26, 126, 226, 326, 426, 526 applies to the electrical power system architecture 626, unless otherwise noted. One difference is that the electrical power system architecture 626 can include the hydraulic pump/generator 530 connected with the hydraulic loads 21, a hydraulic power storage device 570, and the rechargeable 270 VDC battery 240. Aspects of the rechargeable 270 VDC battery 240 or hydraulic pump/generator 530 can be included wherein one of the modules operably controls the recharging rate, recharging status, stored electrical capacity, or the like, of the battery 240. Additionally, aspects of the 270 VDC battery 240 or hydraulic pump/generator 530 can be included wherein battery 240 or pump/generator 530 can operably convert AC power generated by the pump/generator 530 to an appropriate DC power suitable for charging or recharging the 270 VDC battery 240.

Figure 9:
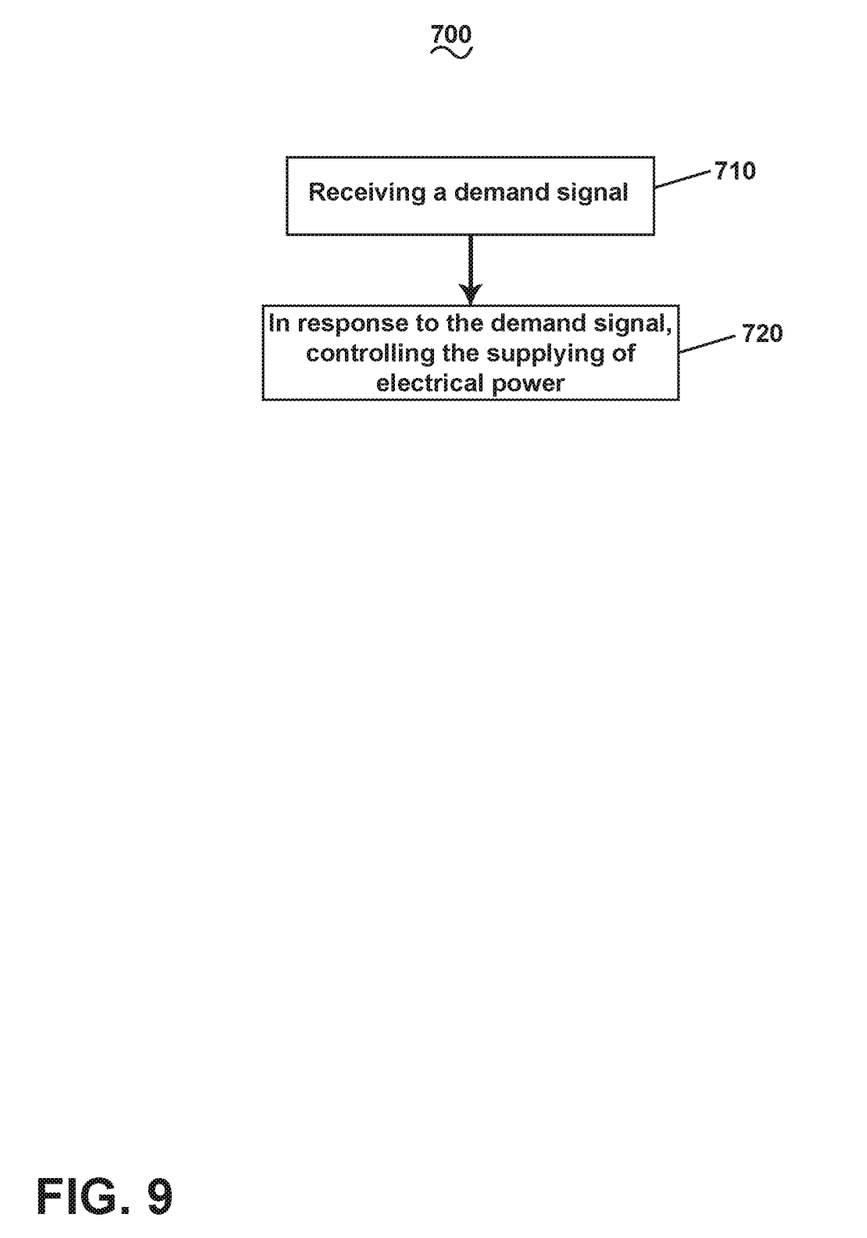
FIG. 9 is an example a flow chart diagram of demonstrating a method of operating the electric power systems, in accordance with various aspects described herein.

FIG. 9 illustrates a non-limiting flow chart demonstrating an example method 700 of operating a power system architecture 26, 126, 226, 326, 426, 526 for the aircraft, in accordance with various aspects described herein. The method 700 begins by receiving, by the controller module 32, a demand signal 56 indicative of at least one of an emergency demand for electrical power or an emergency demand for hydraulic power at 710. The method 700 continues by, in response to receiving the demand signal 56, controlling, by the control module 32, a supplying of electrical power stored in an electrical power storage system to a respective emergency power bus 28, 128, 228 or a hydraulic pump motor 30, 530, and wherein supplying electrical power is proportional to the emergency demand, at 720. Non-limiting aspects of the method 700 can be included wherein, for example, the receiving includes receiving a hydraulic demand signal indicative of the emergency demand for hydraulic power and receiving an electrical demand signal indicative of the emergency demand for electrical power, separately. Another non-limiting aspect of the method 700 can include, for example, operating the hydraulic pump/generator 530 as a generator in response to receiving a hydraulic demand signal that does not indicate an emergency demand for hydraulic power The sequence depicted in the above-described flow charts are for illustrative purposes only and is not meant to limit the method 700 in any way as it is understood that the portions of the methods can proceed in a different logical order, additional or intervening portions can be included, or described portions of the methods can be divided into multiple portions, or described portions of the methods can be omitted without detracting from the described methods.

Many other possible aspects, configurations, or permutations in addition to that shown in the above figures are contemplated by the present disclosure.

The aspects disclosed herein provide an apparatus and method of operating a power system architecture. The technical effect is that the above described aspects enable the operating of the power system architecture as well as the selective supplying of emergency or supplemental power from a set of power storage devices. One advantage that can be realized in the above disclosure is that the above described aspects provide a robust power system architecture having a set of redundant electrical power sources capable of supplementing or replacing power sources during normal or emergency operations. In one non-limiting aspect of the disclosure, the inclusion of the power system architecture described herein can supplement or eliminate conventional ram air turbine (RAT) generators on aircraft, which can otherwise provide electrical or hydraulic power. For instance, RAT generator systems increase aircraft drag once deployed, include additional concerns for vibration and noise during RAT generator operation, and in some cases, cannot be retracted once deployed.

Additional negative effects of RAT generator systems can further include, but are not limited to, restricted altitude and speed operations while deployed, no built in testing features, unable to test RAT operations without deployment, the need for specialized equipment for routine maintenance, start up delays prior to providing electrical or hydraulic power, potential to be inadvertently deployed, and power outputs limited or related to the speed of the RAT fan blades. The above-described aspects of the disclosure do not suffer any of those drawbacks.

Additionally, the power system architecture described herein can be turned or "switched" on and off, as needed, based on the demands or, for example, when an emergency subsides. Yet another advantage of the above-described system is that rechargeable power storage devices can further be recharged using conventional power supplied to the aircraft, effectively allowing the power system architecture to be fully ready in case of an additional demand for electrical or hydraulic power.

In yet another advantage, the above-described systems can result in simpler maintenance with BIT functionality and reporting services, rapid start of power supply, and continuous power supplied at the desired electrical power characteristics (i.e. not variable power). Yet another benefit of the above-described systems is that additional electrical power can be generated from the hydraulic pump/generator, in response to the hydraulic power stored in the hydraulic system.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A power system architecture comprising:
   a rechargeable electrical power storage system;
   a connection between the electrical power storage system and a power distribution bus;
   a hydraulic pump/generator selectively connected with the rechargeable electrical power storage system, and configured to operate as a motor to provide hydraulic power to a hydraulic system and as a generator to generate electrical power from hydraulic power stored in a hydraulic system; and a controller module communicatively coupled with the connection and the hydraulic pump/generator, and configured to selectively actuate the connection upon receiving a power demand signal indicative of a demand for supplemental electrical power to controllably operate at least one of the electrical power storage system or the hydraulic pump/generator in response to the power demand signal.

2. The power system architecture of claim 1, wherein the power demand signal is indicative of a demand for emergency electrical power.

3. The power system architecture of claim 2, wherein the electrical power storage system is the only available source of emergency electrical power.

4. The power system architecture of claim 3, wherein the electrical power storage system is a bank of batteries.

5. The power system architecture of claim 4, where at least a subset of the bank of batteries are rechargeable batteries.

6. The power system architecture of claim 5, wherein the rechargeable batteries are recharged by the power system architecture.

7. The power system architecture of claim 6, wherein the bank of batteries are sized to controllably supply power from the power storage system to the power distribution bus.

8. The power system architecture of claim 7, wherein the bank of batteries are disposed about an aircraft.

9. The power system architecture of claim 8, wherein the bank of batteries are disposed about an aircraft to provide aircraft balance during flight operations.

10. The power system architecture of either of claim 2, wherein the power distribution bus is an emergency power distribution bus.

11. The power system architecture of claim 1, wherein the electrical power storage system includes at least one rechargeable battery, and wherein the hydraulic pump/generator is configured to recharge the at least one rechargeable battery when operating as a generator.

12. A method of operating a power system architecture, comprising:

receiving, by a control module, a demand signal indicative of at least one of an emergency demand for electrical power or an emergency demand for hydraulic power; and in response to receiving the demand signal, controlling, by the control module, a supplying of electrical power stored in an electrical power storage system to a respective emergency power bus and to a hydraulic pump motor, and to a set of hydraulic loads wherein supplying electrical power is proportional to the emergency demand.

13. The method of claim 12, further comprising receiving, by the control module a hydraulic demand signal indicative of the emergency demand for hydraulic power and an electrical demand signal indicative of the emergency demand for electrical power.

14. The method of claim 13, further comprising operating a hydraulic pump/generator as a generator in response to receiving a hydraulic demand signal that does not indicate an emergency demand for hydraulic power.

* * * * *